(Model.)

J. F. NOONE.
TRUSS.

No. 291,391. Patented Jan. 1, 1884.

Witnesses.
Arthur Lippitten
John F. C. Prinkert

Inventor.
Joseph F. Noone
by Crosby & Gregory
Attys.

N. PETERS, Photo-Lithographer, Washington, D. C.

United States Patent Office.

JOSEPH F. NOONE, OF PETERBOROUGH, NEW HAMPSHIRE.

TRUSS.

SPECIFICATION forming part of Letters Patent No. 291,891, dated January 1, 1884.

Application filed August 17, 1883. (Model.)

*To all whom it may concern:*

Be it known that I, JOSEPH F. NOONE, of Peterborough, county of Hillsborough, State of New Hampshire, have invented an Improvement in Trusses, of which the following description, in connection with the accompanying drawings, is a specification, like letters on the drawings representing like parts.

This invention has for its object the production of novel devices whereby the pad may be readily adjusted to enable it to bear properly upon a rupture or part of the body to be supported by the pad. In this my invention the pad is so connected to a pad-carrier (shown as a rod) that the pad may be adjusted both longitudinally and axially with relation to the said carrier, and the carrier is hinged or pivoted upon an adjustable arm, which in turn is pivoted upon the body-spring. The said carrier is provided with a spring-bolt to engage teeth on the arm referred to, so that the lower end of the pad may be thrown more or less under the abdomen, and the said arm, at its upper end, is adjustably connected with the body-spring, so that the pad may be turned more or less into or from the groin, and to permit the pad to be reversed to make a right and left hand truss.

Figure 1:
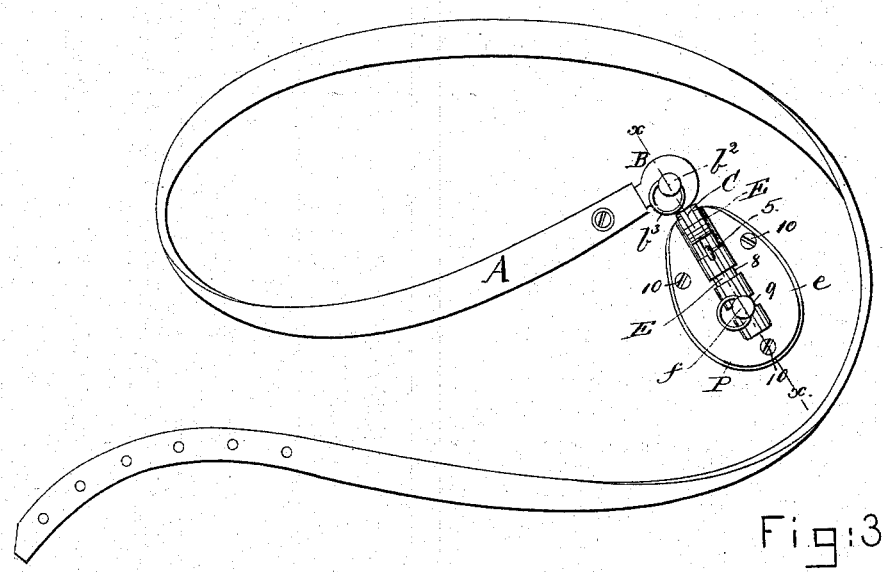
Figure 2:
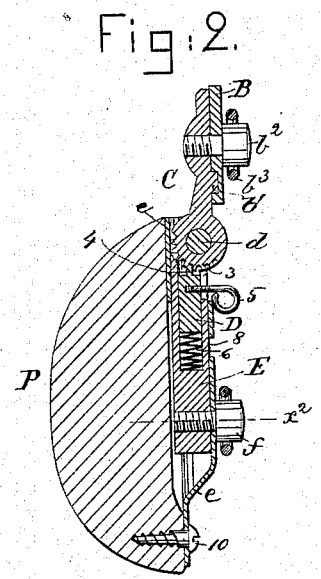
Figures 3, 4:
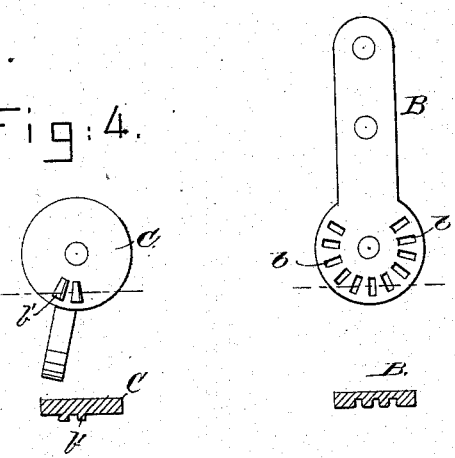
Figure 5:
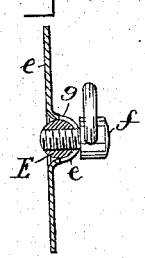

Figure 1 represents in perspective view one of my improved trusses; Fig. 2, a section along the dotted line of Fig. 1, enlarged; Fig. 3, a detail of the end piece of the body-spring and a section thereof; Fig. 4, a detail of the adjustable arm and a section thereof; and Fig. 5, a partial section on the line $x^2$, Fig. 2.

The body-spring or part A, suitably covered, has riveted upon its end the end piece, B, provided at its inner side (see Fig. 3) with a circular series of recesses, $b$, adapted to receive the small cogs or projections $b'$ on the adjustable arm C, when the said end piece and arm are connected and forced together by the screw $b^2$, herein shown as provided with a ring, $b^3$, by which to turn the screw when it is desired to clamp the parts B and C together in adjusted position, the pad P being at such time turned more or less into or from the groin about the pivot-screw $b^2$, according to the position of the rupture with relation to the groin or abdomen. The adjustable arm C has a circular head or end provided with a series of recesses, 3, adapted to be engaged by a broad tooth, 4, at the outer end of a locking device or finger, D, having a projection or knob, 5, adapted to be engaged and moved by hand, the said locking device being placed in a recess in the pad-carrier E, and being acted upon by a spring, 6. As herein shown, the locking device resembles a bolt. The pad-carrier, made as a round rod and pivoted to the adjustable arm C by the bolt or screw $d$, is extended into a recess made in the metal back-plate $e$ of the pad P, parts of the back-plate being located at opposite sides of the said carrier, making a recess in which the carrier is extended. This carrier has a threaded hole to receive the ring-bolt or screw $f$, which, passed through a suitable hole in the back-plate, enables the pad to be confined to the carrier. In the drawings the said ring-bolt or screw is inserted through the slot 9 of the back-plate, and the pad is in its highest position; but if the said ring-bolt were taken out and inserted through the slot 8—the pad having been moved on the carrier—the ring-bolt may be inserted into the threaded hole in the carrier, and thus place the pad farther out toward the end of the said carrier. By loosening the ring-bolt the pad may be turned axially to throw one side in farther than the other side. The adjustment of the pad-carrier and attached pad about the pivot $d$ enables the lower end of the pad to be swung or turned in or out more or less, according to the shape of the person, or the degree and extent of inward pressure desired. The back-plate is attached to the pad by screws 10.

The parts herein described may be easily and quickly adjusted to fit the person having the rupture to be held or treated, and by reason of the knob 5 and the ring-bolt the pressure of the pad upon the person may be made more or less without the employment of a screw-driver, and without removing the truss or the clothing.

I do not broadly claim a notched end piece for the body part of a truss, as substantially such element has been used.

I claim—

1. The body-spring A, having the end piece, B, provided with recesses combined with the pad, its arm C, having cogs to engage the said recessed end piece in any of the several lateral adjustments of which the pad is thereby capable, a fastening device, $b^2$, and a spring-bolt, D, to engage the lower end of the said pad-arm to hold the pad in any of the in and out adjustments thus permitted, substantially as shown and described.

2. The combination, substantially as shown and described, of the pad, the pad-carrier E, upon which the pad is movable longitudinally, the ring-bolt or the like, $f$, to hold the pad and its carrier in adjusted position, and the lever connecting the pad and body-spring, to which lever the pad is hinged and rendered movable toward and from the wearer, and held in such position by a spring-bolt in the carrier, all as set forth.

In testimony whereof I have signed my name to this specification in the presence of two subscribing witnesses.

JOSEPH F. NOONE.

Witnesses:
G. W. GREGORY,
B. J. NOYES.